United States Patent [19]
Miles

[11] 4,425,980
[45] Jan. 17, 1984

[54] BEAM DAMPERS FOR DAMPING THE VIBRATIONS OF THE SKIN OF REINFORCED STRUCTURES

[75] Inventor: Ronald N. Miles, Kirkland, Wash.

[73] Assignee: The Boeing Company, Seattle, Wash.

[21] Appl. No.: 330,082

[22] Filed: Dec. 14, 1981

[51] Int. Cl.³ .............................................. F16F 15/00
[52] U.S. Cl. .................................. 181/208; 181/290; 181/294; 244/119; 428/120; 52/403; 52/806
[58] Field of Search ............................... 181/207–209, 181/290, 291, 294; 52/144, 806, 403, 727, 732, 729; 244/119, 1 N, 117 R, 123; 248/632, 636; 428/909, 120

[56] References Cited

U.S. PATENT DOCUMENTS

| | | | |
|---|---|---|---|
| 2,097,597 | 11/1937 | Pavlecka | 244/123 |
| 2,233,969 | 3/1941 | Woods | 244/123 |
| 2,254,152 | 8/1941 | Klemm | 244/119 |
| 2,412,838 | 12/1946 | Shores | 248/632 |
| 2,427,853 | 9/1947 | Goodlett | 244/123 |
| 2,819,032 | 1/1958 | Detrie et al. | 244/119 |
| 2,877,970 | 3/1959 | Albertine et al. | 244/119 |
| 3,020,986 | 2/1962 | Kirk et al. | 52/806 |
| 3,029,910 | 4/1962 | Kirk et al. | 244/117 R X |
| 3,029,914 | 4/1962 | Macomber | 52/732 |
| 3,058,704 | 10/1962 | Bergstedt | 244/119 |
| 3,071,217 | 1/1963 | Gould | 244/119 |
| 3,078,969 | 2/1963 | Campbell et al. | |
| 3,078,971 | 2/1963 | Wallerstein | |
| 3,079,277 | 2/1963 | Painter | |
| 3,080,022 | 3/1963 | Mote | 181/290 |
| 3,087,571 | 4/1963 | Kerwin, Jr. | 181/208 |
| 3,087,573 | 4/1963 | Ross | 181/208 |
| 3,087,574 | 4/1963 | Watters | |
| 3,088,561 | 5/1963 | Ruzicka | 52/727 |
| 3,101,744 | 8/1963 | Warnaka | 138/139 |
| 3,127,213 | 3/1964 | Klaasen | 296/39 A |
| 3,142,610 | 7/1964 | Lowe | |
| 3,159,249 | 12/1964 | Lazan | 244/119 |
| 3,160,549 | 12/1964 | Caldwell et al. | |
| 3,262,521 | 7/1966 | Warnaka | |
| 3,314,502 | 4/1967 | Thorn | |
| 3,327,812 | 6/1967 | Lazan | |
| 3,386,527 | 6/1968 | Daubert et al. | 181/208 |
| 3,401,907 | 9/1968 | McDermott | 248/636 |
| 3,419,111 | 12/1968 | Jones et al. | |
| 3,467,572 | 9/1965 | Ahramjian | 428/909 |
| 3,554,855 | 1/1971 | Oberst et al. | |
| 3,601,228 | 8/1971 | Nashif | |
| 3,605,953 | 9/1971 | Caldwell et al. | |
| 3,817,356 | 6/1974 | Dahlquist | |
| 3,827,530 | 8/1974 | Heath | |
| 3,842,945 | 10/1974 | Potter | |
| 3,872,950 | 5/1975 | Ashfield et al. | |
| 3,940,553 | 2/1976 | Hawkins | |
| 3,976,269 | 8/1976 | Gupta | 52/144 |
| 4,012,549 | 5/1977 | Slysh | 428/116 |
| 4,014,148 | 3/1977 | Harter | 52/403 |
| 4,096,307 | 6/1978 | Lagowski | 181/290 X |
| 4,097,193 | 6/1978 | Brunsch et al. | 416/224 |
| 4,230,293 | 10/1980 | Hamm et al. | 244/119 |
| 4,313,524 | 2/1982 | Rose | 181/291 |

FOREIGN PATENT DOCUMENTS

| | | |
|---|---|---|
| 850389 | 7/1952 | Fed. Rep. of Germany . |
| 796263 | 4/1936 | France . |
| 513171 | 10/1939 | United Kingdom . |

*Primary Examiner*—Benjamin R. Fuller
*Attorney, Agent, or Firm*—Christensen, O'Connor, Johnson & Kindness

[57] ABSTRACT

Beam dampers comprising a stiff, lightweight, elongate beam and layer of viscoelastic material located along an attachment flange of the beam are disclosed. The flanges of the beam is attached by the layer of viscoelastic material to the skin of a structure whose skin vibrations are to be damped. While a beam having a cross-sectional I-shape is preferred, other cross-sectional shapes can be used, such as L, Z, U and T-shapes. Regardless of their shapes, the beam acts as a constraining element for the viscoelastic attachment layer. The beam is oriented such that it is stiff in a plane transverse to the plane of the skin, resulting in thickness deformation of the layer of viscoelastic material (rather than shear deformation) converting vibration energy into heat.

30 Claims, 21 Drawing Figures

BEAM DAMPERS FOR DAMPING THE VIBRATIONS OF THE SKIN OF REINFORCED STRUCTURES

TECHNICAL AREA

This invention relates to vibration damping and, more particularly, to damping mechanisms that use layers of viscoelastic material to convert skin vibrations into heat.

BACKGROUND OF THE INVENTION

While the hereinafter described invention was conceived for use in reducing the noise in the cabin of an aircraft, it is to be understood that the invention can be used to reduce noise and vibration in other types of structures. This includes all types of transportation vehicles—automobiles, buses, trucks, ships, submarines, hovercraft and hydrofoils, for examples. The invention can also be used in the exterior and interior walls of buildings and other enclosures where noise reduction is desired. Moreover, the skin whose vibration is to be damped may be the exterior skin of a structure or it may be the skin of interior items, such as interior walls, ceilings or floors (frequently referred to as the deck in transportation vehicles).

It is also to be understood that, because interior noise is reduced by damping skin vibrations, coincidental to the reduction of noise is a corresponding improvement in the sonic fatigue life of the skin and items attached to the skin. That is, reducing vibration not only reduces noise, it also improves the sonic fatigue life of the vibrating structure and items attached thereto.

In the past, the most common way of reducing skin vibration in commercial aircraft has been to apply skin damping tape to selected skin surfaces. Skin damping tape comprises a layer of viscoelastic material and a thin constraining layer, formed of aluminum foil, for example. The layer of viscoelastic material has adhesive properties, whereby the damping tape can be directly attached to the selected surface of the skin. In some instances several layers of damping tape are applied on top of one another to the region of the skin whose vibrations are to be damped. As the skin vibrates, shear strain is induced in the viscoelastic material, which causes the viscoelastic material to dissipate energy.

The use of damping tape of the type briefly discussed above has two major disadvantages. First, the use of damping tape adds an undesirably large amount of weight to the resulting structure for the amount of damping produced. This is particularly true when several layers of damping tape are required to obtain an adequate amount of noise reduction. Second, the application of damping tape is more labor intensive than desirable for the amount of damping produced. Again, this is particularly true when several layers of damping tape are required to obtain an adequate amount of noise reduction.

Another way of reducing skin vibration in commercial aircraft that has been used in the past is the addition of stiffeners. In some aircraft, stiffeners, plus one or more layers of damping tape have been used. For example, in the past the soundproofing in the upper deck of a Model 747 aircraft produced by The Boeing Company, Seattle, Wash., has included several hundred stiffeners and two layers of damping tape installed in selected areas. As with the use of skin damping tape alone, the use of stiffeners with or without damping tape adds an undesirably large amount of weight to the aircraft for the resultant amount of damping, and is more labor intensive than desirable.

Regardless of the approach used, the addition of large amounts of weight to achieve a desired objective, i.e., noise reduction, is disadvantageous in a transportation environment because any additional weight either increases fuel consumption, decreases payload over the lifetime of the transportation vehicle, or effects both parameters. While fuel consumption is, of course, of considerable importance in all vehicular environments, it is most critical in aircraft environments due to the already high fuel/payload ratio. And, of course, in any production environment, the use of high labor intensive approaches to solve any problem undesirably increases the price of the resultant product.

Various proposals have been made to reduce vibration and, thus, noise in aircraft and other environments. One such proposal is described in the U.S. patent application Ser. No. 79,325 filed Sept. 27, 1979 and entitled "Method and Apparatus for Wideband Vibration Damping of Reinforced Skin Structures" by Lloyd D. Jacobs, et al. (now abandoned) and U.S. patent application Ser. No. 297,945 filed Aug. 31, 1981 and entitled "Method and Apparatus for Wideband Vibration Damping of Reinforced Skin Structures" by Lloyd D. Jacobs, et al., which is a confirmation-in-part of U.S. application Ser. No. 79,325. In this proposal a stiff brace is attached with a viscoelastic adhesive at one end to the skin of a reinforced skin structure and at the other end to a structural element of the reinforced skin structure. Vibration of the skin is directly damped by the layer of viscoelastic material attaching the brace to the reinforcing member. The indirect vibration damping assistance to the direct vibration damping allows the amount of direct vibration damping to be decreased. Another proposal is described in U.S. patent application Ser. No. 306,951, filed Sept. 30, 1981 and entitled "Viscoelastically Damped Reinforced Skin Structures" by Lloyd Jacobs. This proposal also uses direct and indirect damping, except that the coupling element is a layer of honeycomb or foam material rather than a brace and an overlying panel. The honeycomb or foam material provides thermal insulation as well as assists in vibration damping and noise reduction.

While the foregoing proposals have certain advantages in some environments, their weight and cost is such that they are unsatisfactory in other environments.

SUMMARY OF THE INVENTION

In accordance with this invention, beam dampers comprising a stiff, lightweight elongate beam and an attachment layer of viscoelastic material located on one flange of the beam are provided. The flange of beam is attached by the layer of viscoelastic material to the skin of the structure whose skin vibrations are to be damped. Thus, the beam acts as a constraining element for the viscoelastic attachment layer. Due to the stiffness of the beam in directions transverse to the plane of the skin, the viscoelastic attachment layer is deformed in thickness, rather than in shear. As a result, thickness deformation, rather than shear deformation, is the mechanism through which the viscoelastic attachment layer converts vibration energy into heat. The end result is a substantially greater amount of acoustical damping for a given weight of damping mechanism.

While the preferred cross-section shape of the stiff, lightweight, elongate beam is I, the beam may have other cross-sectional shapes, such as T, U, L, Z and the like. Further, the beam can be formed of a suitably rigid metallic material (e.g., aluminum) or a nonmetallic material (e.g., cured Kevlar). Further, depending upon the nature of the material, the beam can be formed in any conventional manner, such as by extrusion or injection molding, for example. Also, the beam can be formed of suitable elements joined together. For example, an I-beam can be formed of two channels adhesively affixed together in a back-to-back manner along their cross-members or webs.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Because the mechanical deformation, via which a viscoelastic layer converts vibration energy into heat energy, differs between a beam damper formed in accordance with the present invention and prior art damping mechanisms comprising a layer of viscoelastic material and a thin constraining layer, a brief description of the nature and operation of such prior art damping mechanisms is described. In this regard, FIG. 1, which includes an exemplary cross-sectional view of such prior art damping mechanisms, comprises: a section of skin 31 whose vibrations are to be damped; a layer of viscoelastic material 33; and, a thin constraining layer 35. As will be readily appreciated by those skilled in this art, viscoelastic materials such as the ISD 830 viscoelastic material sold by the Minnesota Manufacturing and Mining Company, St. Paul, Minn., have an adhesive property. The adhesive property allows the viscoelastic material to readily adhere to other items such as the thin constraining layer 35 and the skin 31. The thin constraining layer may take the form of aluminum foil, for example. Frequently, the thin constraining layer 31 and the viscoelastic layer are sold as a unitary product denoted as damping tape. As will be readily appreciated by those familiar with viscoelastic materials, such materials damp vibration by converting vibration energy into heat.

Figures 1, 2:
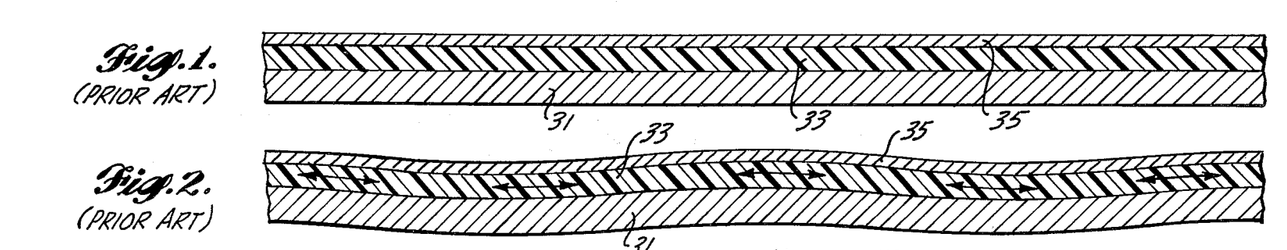
FIG. 1 is a cross-sectional view of a prior art damping tape, i.e., a damping mechanism that includes a layer of viscoelastic material and a thin, flexible constraining layer attached by the layer of viscoelastic material to a skin whose vibrations are to be damped.
FIG. 2 is a cross-sectional view similar to FIG. 1 showing the mechanical deformation that occurs when the skin vibrates.

FIG. 2 illustrates the mechanical deformation that occurs when the skin 31 is vibrated. Specifically, as the skin 31 vibrates, sinusoidal-type waves traverse the surface of the skin. As a result, the skin 31 flexes. Skin flexing causes flexing of the viscoelastic layer 33. Due to its thinness, the constraining layer also flexes when the skin flexes. Even though it flexes, the constraining layer places some constraint on the flexing of the viscoelastic layer. Because the viscoelastic layer is constrained, it is deformed along shear planes, generally represented by the double-ended arrows in FIG. 2. It is this shear deformation that converts vibration energy into heat energy.

While only a single viscoelastic material and constraining layers 33 and 35 are illustrated in FIG. 1, which represents a single layer of "damping tape", in many instances, several layers of each item are laid one on top of another to produce a thicker sandwich that provides the requisite amount of vibration damping. In such sandwiches each of the constraining and viscoelastic material layers flex in the manner illustrated in FIG. 2 whereby shear deformation occurs in each of the viscoelastic material layers.

Figure 3:
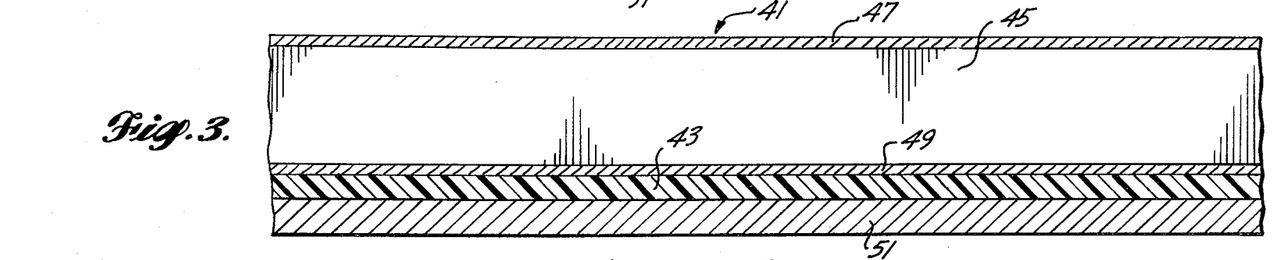
FIG. 3 is a cross-sectional view illustrating a beam damper formed in accordance with the invention attached to a skin whose vibrations are to be damped.
Figure 4:
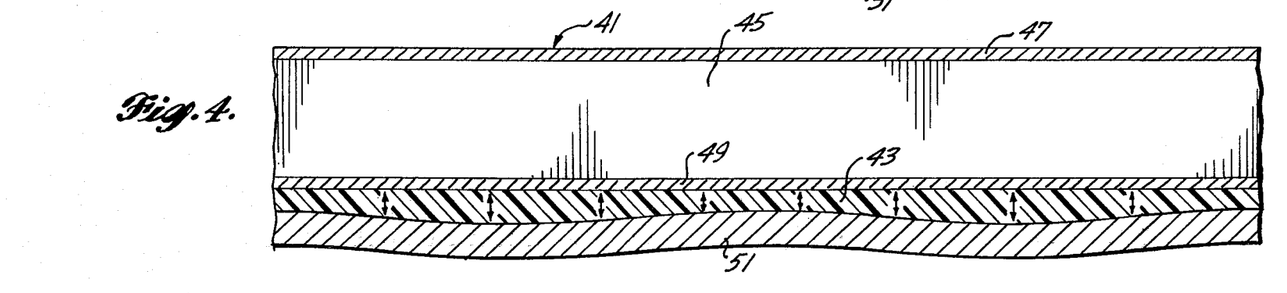
FIG. 4 is a cross-sectional view similar to FIG. 3 showing the mechanical deformation that occurs when the skin vibrates.

FIGS. 3 and 4 illustrate the mechanical deformation that occurs when a beam damper formed in accordance with the invention is attached to a skin 51. The beam damper comprises: a stiff, lightweight, elongate beam 41; and, a layer of viscoelastic material 43. Preferably the stiff, lightweight elongate beam 41 has a cross-sectional I-shape, whereby the beam includes a web 45 and upper and lower flanges 47 and 49. The outer face of the lower flange 49 is attached by the layer of viscoelastic material 43 to the skin 51 whose vibrations are to be damped.

As will be readily appreciated from the foregoing description, the stiff, lightweight, elongate beam 41 replaces the constraining layer 35 of the damping mechanism illustrated in FIGS. 1 and 2. Because of this change, rather than shear deformation of the viscoelastic layer creating vibration damping, vibration damping is accomplished via thickness deformation, as illustrated in FIG. 4. More specifically, because the outer face of the lower flange 49 of the beam 41 is viscoelastically attached to the skin 51, the web 45 lies orthogonal to the plane of the skin 51. Due to its stiffness, the beam does not flex appreciably when the skin ripples as it vibrates. As a result, very little, if any, shear deformation occurs in the viscoelastic material layer. Rather, as illustrated by the double-ended arrows in FIG. 4, thickness deformation of the viscoelastic material layer 43 occurs. It is this difference in mechanical deformation that produces the hereinafter described weight/vibration damping benefits.

Figures 5, 6:
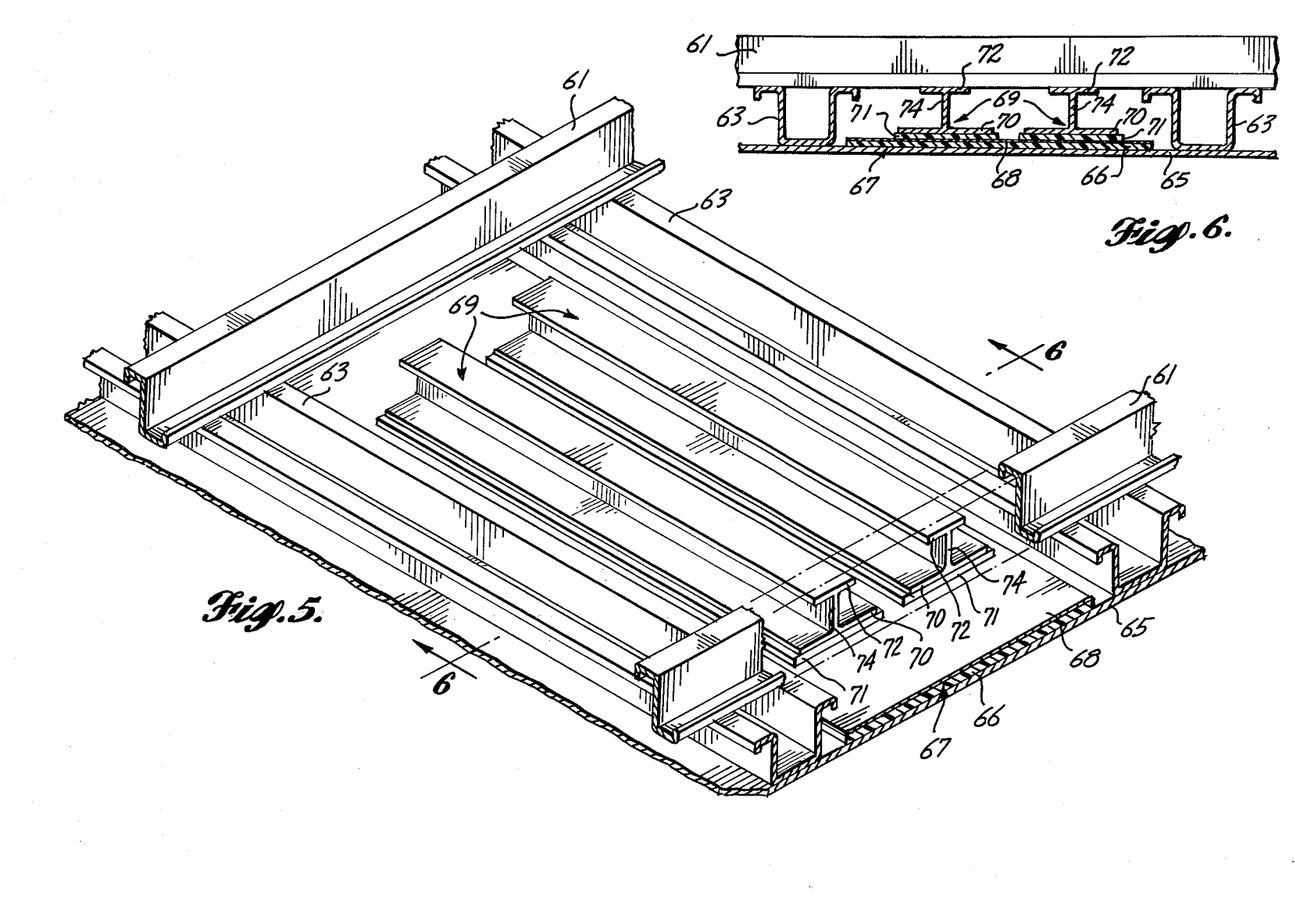
FIG. 5 is an isometric view illustrating beam dampers formed in accordance with the invention attached to the skin of a reinforced skin structure.
FIG. 6 is a cross-sectional view along line 6—6 of FIG. 5.

FIG. 5 illustrates a preferred embodiment of the invention mounted in a reinforced skin structure, e.g., an area of the fuselage of an aircraft, to damp the vibrations of the skin of the reinforced skin structure. More specifically, FIG. 5 is a partial view of a reinforced skin structure that includes a plurality of parallel oriented stringers 63 attached, by rivets for example, to a plurality of frame members 61. The frame members 61 lie orthogonal to the longitudinal axes of the stringers. The stringers, in turn, support a skin 65. Attached to the skin 65, between each pair of adjacent stringers 63, is a layer of damping tape 67 of the type illustrated in FIGS. 1 and 2 and heretofore described. That is, the damping tape 67 includes a layer of viscoelastic material 66 and a thin, flexible, constraining layer 68 located on the opposite side of the viscoelastic layer from the skin 65. Mounted on the outer face of the thin, flexible constraining layer 68 of the damping tape 67 are two beam dampers formed in accordance with the invention. Each beam damper includes an I-beam 69 and a layer of viscoelastic material 71. The I-beams 69 are stiff, lightweight and elongate; and, are positioned such that their longitudinal axes lie parallel to the longitudinal axes of the stringers 63. One flange 70 of the I-beams 69 faces the damping tape 67. This flange 70 is wider than the other flange 72 of the I-beams 69. The flanges 70 and 72 are joined by an orthogonal web 74. The wider flanges of the I-beams 69 are attached by the layers of viscoelastic material 71 to the adjacent face of the layer of damping tape 67.

While, obviously, the I-beams 69 can take on a wide variety of sizes, in one actual embodiment of the invention, designed for use in the 747 aircraft produced by The Boeing Company, Seattle, Wash., the width of the wide flange of the chosen I-beam was two-and-a-half (2½) inches and the width of the narrow flange was one (1) inch. The distance between the outer faces of the wide and narrow flanges was one-and-one-fourth (1¼) inches and the flanges had a thickness of approximately two hundredths (0.02) of an inch. These I-beams were formed of Kevlar (TM). Kevlar (TM) is a trademark of the E. I. Dupont Company, Wilmington, Del. used with a high strength-to-weight ratio synthetic material, namely an aromatic polyamide. The I-beam configuration was created by: forming two suitably sized C-shaped channels (one leg being longer than the other) from a Kevlar (TM) web; joining the backs of the layers together; and, placing the resultant structure in an oven, controlled so as to liquify and cure the Kevlar (TM) resin, all in a conventional manner. The layers of viscoelastic material 71, used to attach the resultant I-beams 69 to a layer of damping tape in the manner illustrated in FIG. 5 and heretofore described, were formed of ISD 830 viscoelastic adhesive sold by the Minnesota Manufacturing and Mining Company, St. Paul, Minn.

It is to be understood that the forming of the I-beam from Kevlar (TM) and the use of the particular viscoelastic adhesive designated above are by way of illustration only. Obviously, other materials can be used in the aircraft and other environments to form the beam. Such materials include other types of nonmetallic materials and various types of metallic materials, such as aluminum, for example. Also other types of viscoelastic materials can be utilized to attach the beam to the skin whose vibrations are to be damped. In addition, it is to be understood that, in some environments, the single layer of damping tape 67 can be eliminated. The tape is included in the particular structural arrangement heretofore described in order to provide additional damping at frequencies above 2000 Hz since the particular beam configuration illustrated and described provides maximum damping below this frequency level.

The primary advantages of the present invention are: a reduction in weight of the damping mechanism required to achieve a predetermined level of damping; and, a reduction in the amount of manual labor required to install the damping mechanism, i.e., the beam dampers. In this regard, an analytical comparison between the present invention and a previous sound proofing treatment that included stiffeners to provide sound proofing in the upper deck of a 747-200 Aircraft with a stretched upper deck, produced by The Boeing Company, Seattle, Wash., estimated a labor reduction from 520 manhours to 30 manhours (a savings of 490 manhours) and a weight reduction from 260 pounds to 40 pounds (a savings of 220 pounds).

Figure 7:
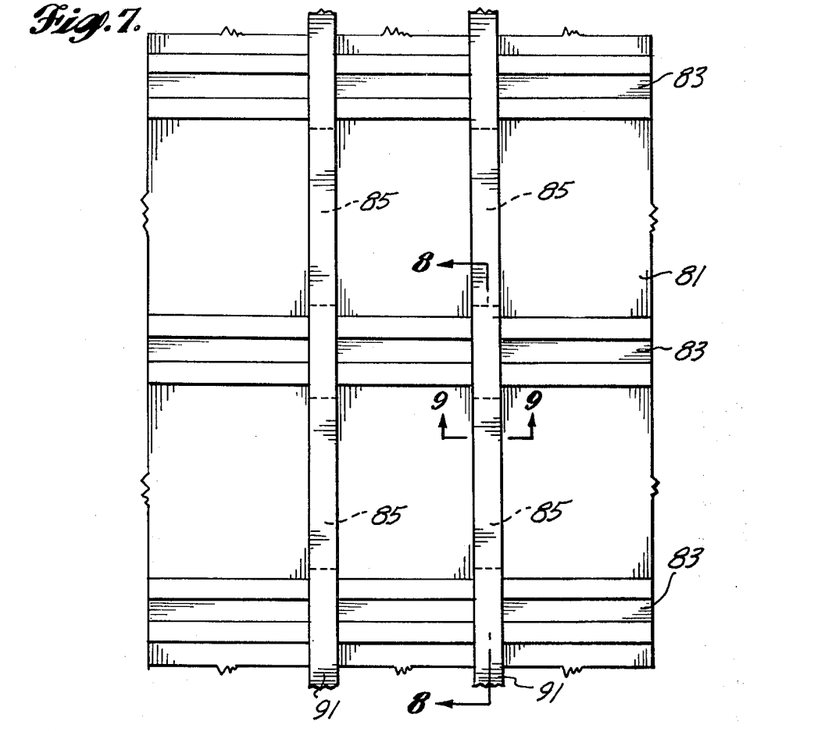
FIG. 7 is a plan view of beam dampers formed in accordance with the invention attached to the skin of a reinforced skin structure, oriented in a different manner than illustrated in FIG. 5.
Figure 8:
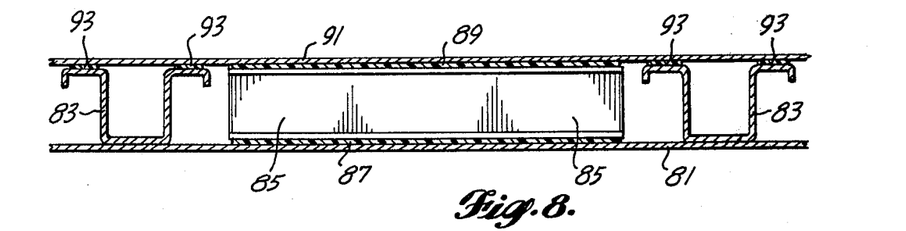
FIG. 8 is a cross-sectional view along line 8—8 of FIG. 7.
Figure 9:
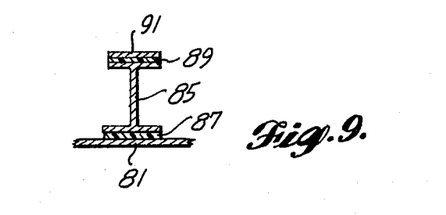
FIG. 9 is a cross-sectional view along line 9—9 of FIG. 7.
Figure 10:
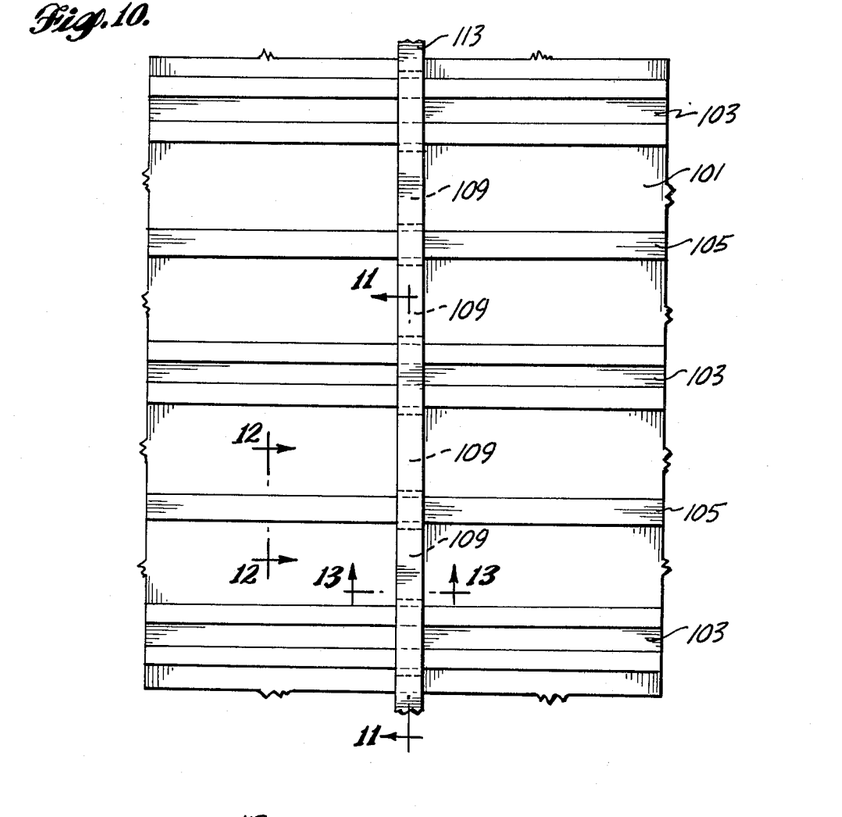
FIG. 10 is a plan view of beam dampers formed in accordance with the invention attached to the skin of a reinforced skin structure, oriented in a different manner than illustrated in FIGS. 5 or 7.
Figure 11:
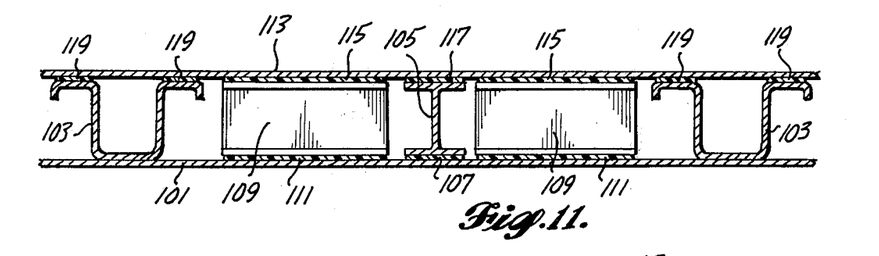
FIG. 11 is a cross-sectional view along line 11—11 of FIG. 10.
Figure 12:
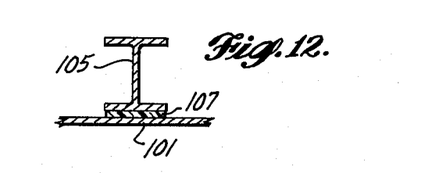
FIG. 12 is a cross-sectional view along line 12—12 of FIG. 10.
Figure 13:
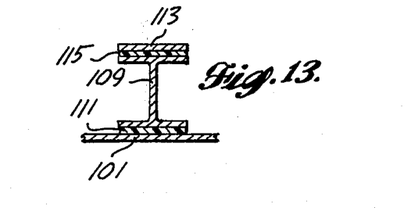
FIG. 13 is a cross-sectional view along line 13—13 of FIG. 10.
Figure 14:
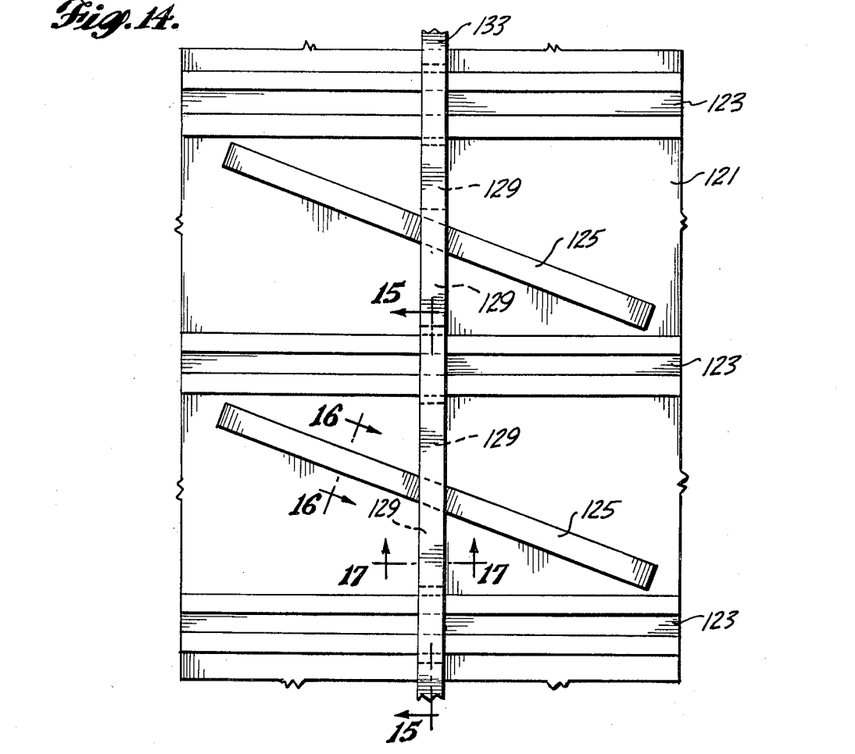
FIG. 14 is a plan view of beam dampers formed in accordance with the invention attached to the skin of a reinforced skin structure, oriented in a different manner than illustrated in FIGS. 5, 7 or 10.
Figures 15, 16, 17:
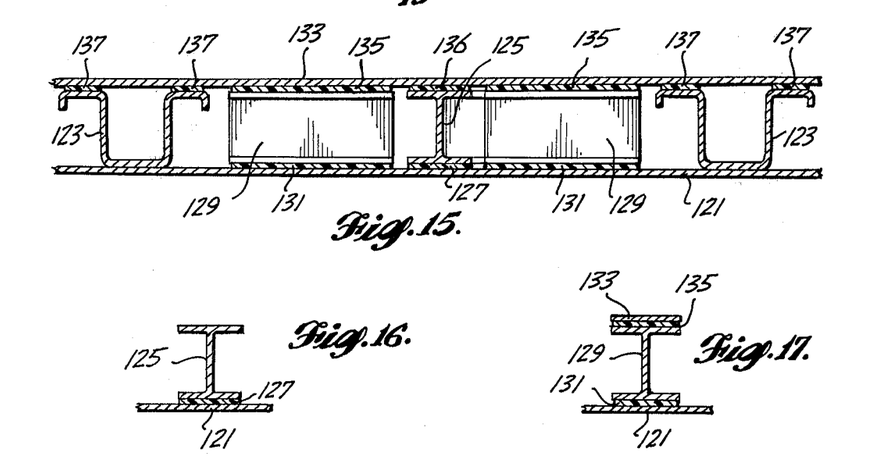
FIG. 15 is a cross-sectional view along line 15—15 of FIG. 14.
FIG. 16 is a cross-sectional view along line 16—16 of FIG. 14.
FIG. 17 is a cross-sectional view along line 17—17 of FIG. 14.

FIGS. 7-9 illustrate an alternative embodiment of the invention wherein the stiff, lightweight elongate beams lie orthogonal to the longitudinal axes of the stringers of a reinforced skin structure. More specifically, FIGS. 7-9 illustrate a skin 81 supported by a plurality of parallel stringers 83. Orthogonally positioned between the stringers are a plurality of I-beams 85. The outer face of one flange of the I-beams 85 are attached by viscoelastic layers 87 to the inner face of the skin 81. Rather than leaving the other flanged of the I-beams 85 free, as in the embodiment of the invention illustrated in FIGS. 5 and 6, the outer faces of the other flanges of the I-beams 85 are connected by second viscoelastic layers 89 to overlying strips 91. The overlying strips extend to, and overlie, the adjacent stringers 83 and are attached thereto by viscoelastic layers 93. The strips stiffen the I-beams and the viscoelastic attachments between the strips and the elements they overlie add additional damping.

Rather than utilizing an I-beam having larger flanges attached to the skin 81, FIG. 9 illustrates that the I-beam flanges are of equal width. Obviously, if desired, the flange attached to the skin 81 could be wider than the flange attached to the strip 91. Further, while the embodiment of the invention illustrated in FIGS. 7-9 does not include a layer of damping tape located between the flange of the I-beam 85 attached to the skin 81 and the skin 81, obviously, if desired, such a layer of damping tape could be included.

FIGS. 10—13 illustrate a further alternative embodiment of the invention. More specifically, FIGS. 10-13 illustrate a reinforced skin structure wherein a skin 101 is supported by a plurality of parallel stringers 103. Lying midway between each pair of adjacent stringers 103 is stiff, lightweight long I-beam 105. The longitudinal axes of the long I-beams 105 lie parallel to the longitudinal axes of the stringers 103. The outer faces of one of the flanges of the long I-beams 105 are attached by a layer of viscoelastic material 107 to the inner face of the skin 101. A plurality of stiff, lightweight short I-beams 109 lie between the I-beams 105 and the stringers 103 adjacent thereto. The longitudinal axes of the short I-beams 109 are orthogonal to the longitudinal axes of the stringers 103 and the long I-beams 105. The outer faces of one of the flanges of the short I-beams 109 are connected by layers of viscoelastic material 111 to the inner face of the skin 101. Further, a strip 113 overlies the short I-beams 109, and sections of the long I-beams 105 and the adjacent stringers 103. More specifically, the longitudinal axes of the strips lie parallel to the longitudinal axes of the short I-beams and orthogonal to the longitudinal axes of the long I-beams and the stringers. The strips are attached by layers of viscoelastic material 115 to the outer face of the other flanges of the short I-beams that they overlie. Further layers of viscoelastic material 117 and 119 attach the strips to the areas of the long I-beams and the stringers in the area where the strips overlie these elements. The strips stiffen the short I-beams and the viscoelastic attachment to the strips add additional damping.

FIGS. 14-17 illustrate a further alternative embodiment of the invention. More specifically, FIGS. 14-17 illustrate a skin 121 supported by a plurality of parallel oriented stringers 123. A plurality of stiff, lightweight, transverse oriented I-beams 125 extend across the gap between adjacent pairs of stringers 123. The transverse oriented I-beams 125 lie neither orthogonal nor parallel to the stringers 123. Rather, the transverse oriented I-beams 125 define acute and obtuse pairs of angles with respect to the stringers 123. The outer faces of one of the flanges of each of the transverse I-beams 125 are attached by a layer of viscoelastic material 127 to the inner face of the skin 121.

Located midway along the length of the transverse oriented I-beams 125, in the space between the transverse oriented I-beams 125 and the adjacent stringers 123, are stiff, lightweight short I-beams 129. The longitudinal axes of the short I-beams 129 lie orthogonal to the longitudinal axes of the stringers 123. Further, the outer faces of one of the flanges of the short I-beams 129 are attached by a layer of viscoelastic material 131 to the inner face of the skin 121. In addition, a strip 133 overlies the short I-beams 129 and extends longitudinally outwardly so as to pass over sections of the stringers 123 and the transverse oriented I-beams 125 lying between adjacent short I-beams 129. Layers of viscoelastic material 135 attach the strip 133 to the short I-beams 129. Other layers of viscoelectric material 136 and 137 attach the strip 133 to the transverse oriented I-beams 125 and the stringers 123. The strips 133 stiffen the short I-beams 129 and, to some extent, the transverse oriented I-beams 125; and, the viscoelastic attachments add additional damping.

Figure 18:
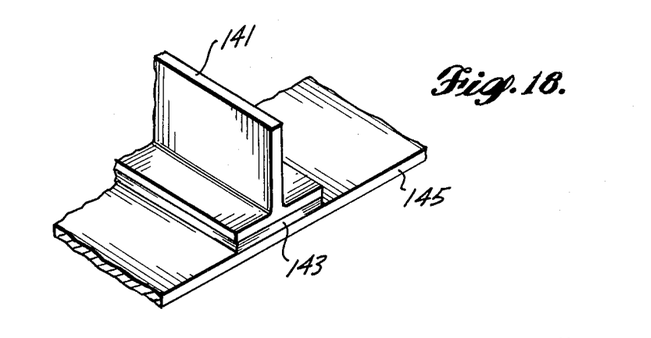
FIG. 18 is a partial, isometric view illustrating an alternate embodiment of a beam damper formed in accordance with the invention.
Figure 19:
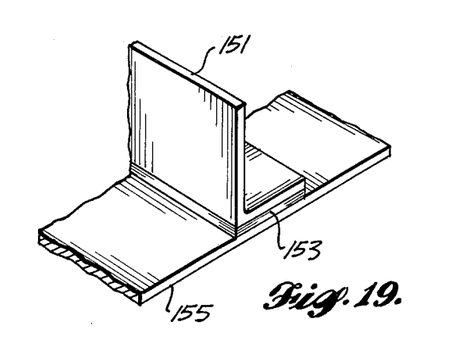
FIG. 19 is a partial, isometric view illustrating another alternate embodiment of a beam damper formed in accordance with the invention.
Figure 20:
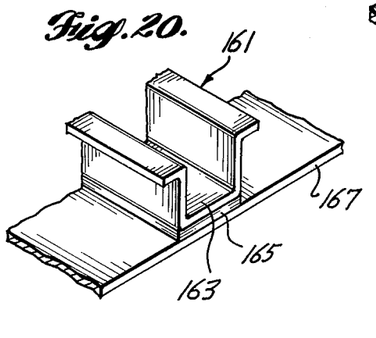
FIG. 20 is a partial, isometric view illustrating a further alternate embodiment of a beam damper formed in accordance with the invention.
Figure 21:
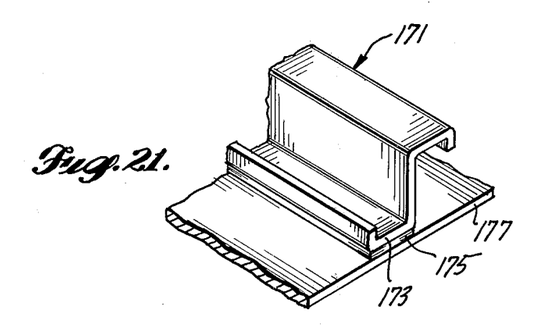
FIG. 21 is a partial, isometric view illustrating a still further embodiment of a beam damper formed in accordance with the invention.

As briefly noted above, in addition to taking the form of an I-beam, the stiff, lightweight beams may take other forms. FIGS. 18-21 are representative illustrations of such other forms. Specifically, FIG. 18 illustrates a T-shaped beam 141. The outer face of the cross-member of the T-beam is attached by a layer of viscoelastic material 143 to a skin 145. FIG. 19 illustrates an L-shaped beam 151. The outer face of one of the legs of the L-shaped beam is attached by a layer of viscoelastic material 153 to a skin 155. FIG. 20 illustrates a hat-shaped beam 161. The outer face of the web 161 of the hat-shaped beam is attached by a layer of viscoelastic material 165 to a skin 167. FIG. 21 illustrates a return flange Z-shaped beam 171. The outer face of one flange 173 of the Z-shaped beam is attached by a layer of viscoelastic material 175 to a skin 177.

As will be readily appreciated from the foregoing description of preferred embodiments of the invention, the invention provides beam dampers that comprise a stiff, lightweight beam that resists bending and a layer of viscoelastic material. The beam is attached to a skin whose vibrations are to be damped by the layer of viscoelastic material. Damping is accomplished by the thickness deformation of the layer of viscoelastic material that takes place as vibrations occur, in contrast to prior art damping mechanisms wherein shear deformation provides damping. If desired, beam dampers formed in accordance with the invention can be combined with one or more layers of damping tape. Further, the edge or face of the beam remote from the face viscoelastically attached to the skin whose vibrations are to be damped can be attached (viscoelastically or rigidly) to nearby components. When a viscoelastic material is used to form part of the attachment mechanism additional vibration damping is provided.

While preferred embodiments of the invention have been illustrated and described, it will be appreciated that various changes can be made therein without departing from the spirit and scope of the invention. For example, the invention can be used to damp elements other than the skin of a reinforced skin structure. In general the invention can be used to damp the vibrations of any thin structural element. Hence, the invention can be practiced otherwise than as specifically described herein.

The embodiments of the invention in which an exclusive property or privilege is claimed are defined as follows:

1. In a reinforced skin structure, wherein a skin is supported by spaced apart reinforcing elements, the improvement comprising: beam dampers attached to said skin between said reinforcing elements for damping vibrations of said skin, each of said beam dampers including:
   a stiff, lightweight elongate beam formed so as to resist bending in at least one plane and including an attachment plate lying orthogonal to said at least one plane; and,
   a layer of material that converts vibration energy into heat when deformed by vibration, said material located on one face of said attachment plate of said beam for attaching said plate to said skin such that said at least one plane in which said beam resists bending lies transverse to said skin, resulting in a thickness deformation of said layer of material when said skin vibrates, said thickness deformation of said layer of material converting vibration energy into heat to damp said skin vibration.

2. The improvement claimed in claim 1 wherein said material that converts vibration energy into heat when deformed by vibration is a viscoelastic material.

3. The improvement claimed in claim 2 wherein said stiff, lightweight elongate beam has an I-shaped cross-sectional configuration and wherein said layer of viscoelastic material is located on the outer face of one of the flanges of said I-shape beam, said flange forming said attachment plate.

4. The improvement claimed in claim 3 wherein said reinforcing elements lie parallel to one another and wherein said beam dampers lie parallel to said reinforcing elements.

5. The improvement claimed in claim 3 wherein said reinforcing elements lie parallel to one another and wherein said beam dampers lie orthogonal to said reinforcing elements.

6. The improvement claimed in claim 3 including a layer of damping tape comprising a layer of viscoelastic material and a thin reinforcing layer positioned between said viscoelastic layer located on said one face of said flange of said I-shaped beam and said skin.

7. The improvement claimed in claim 3 including an overlying reinforcing strip and viscoelastic attachment layers for attaching said overlying reinforcing strip to the other flange of said I-shaped beam and to said reinforcing element.

8. The improvement claimed in claim 3 wherein one flange of said I-shaped beam is wider than the other and wherein said layer of viscoelastic material is located on said wider flange of said I-shaped beam.

9. The improvement claimed in claim 3 wherein said stiff, lightweight elongate beam is formed of metal.

10. The improvement claimed in claim 3 wherein said stiff, lightweight elongate beam is formed of a nonmetallic material.

11. The improvement claimed in claim 10 wherein said nonmetallic material is a high strength-to-weight ratio synthetic material.

12. The improvement claimed in claim 2 wherein said reinforcing elements lie parallel to one another and wherein said beam dampers lie parallel to said reinforcing elements.

13. The improvement claimed in claim 2 wherein said reinforcing elements lie parallel to one another and wherein said beam dampers lie orthogonal to said reinforcing elements.

14. The improvement claimed in claim 2 including a layer of damping tape comprising a layer of viscoelastic material and a thin reinforcing layer positioned between said viscoelastic layer located on said one face of said attachment plate and said skin.

15. The improvement claimed in claim 2 wherein said stiff, lightweight elongate beam has a T-shaped cross-sectional configuration and wherein said layer of viscoelastic material is located on the outer surface of the cross-member of said T-shaped beam, said cross-member forming said attachment plate.

16. The improvement claimed in claim 15 wherein said stiff, lightweight elongate beam is formed of metal.

17. The improvement claimed in claim 15 wherein said stiff, lightweight elongate beam is formed of a nonmetallic material.

18. The improvement claimed in claim 17 wherein said nonmetallic material is a high strength-to-weight ratio synthetic material.

19. The improvement claimed in claim 2 wherein said stiff, lightweight, elongate beam has an L-shaped cross-sectional configuration and wherein said layer of viscoelastic material is located on the outer face of one flange of said L-shaped beam, said one flange forming said attachment plate.

20. The improvement claimed in claim 19 wherein said stiff, lightweight elongate beam is formed of metal.

21. The improvement claimed in claim 19 wherein said stiff, lightweight elongate beam is formed of a nonmetallic material.

22. The improvement claimed in claim 21 wherein said nonmetallic material is a high strength-to-weight ratio synthetic material.

23. The improvement claimed in claim 2 wherein said stiff, lightweight elongate beam has a U-shaped cross-sectional configuration and wherein said layer of viscoelastic material is located on the outer face of the cross-member of said U-shaped beam, said cross-member forming said attachment plate.

24. The improvement claimed in claim 23 wherein said stiff, lightweight elongate beam is formed of metal.

25. The improvement claimed in claim 23 wherein said stiff, lightweight elongate beam is formed of a nonmetallic material.

26. The improvement claimed in claim 25 wherein sid nonmetallic material is a high strength-to-weight ratio synthetic material.

27. The improvement claimed in claim 2 wherein said stiff, lightweight elongate beam has a Z-shaped cross-sectional configuration and wherein said layer of viscoelastic material is located on the outer face of one of the flanges of said Z-shaped beam, said one of the flanges forming said attachment plate.

28. The improvement claimed in claim 27 wherein said stiff, lightweight elongate beam is formed of metal.

29. The improvement claimed in claim 27 wherein said stiff, lightweight elongate beam is formed of a nonmetallic material.

30. The improvement claimed in claim 29 wherein said nonmetallic material is a high strength-to-weight ratio synthetic material.

* * * * *